(12) United States Patent
Flake et al.

(10) Patent No.: US 6,324,633 B1
(45) Date of Patent: Nov. 27, 2001

(54) DIVISION OF MEMORY INTO NON-BINARY SIZED CACHE AND NON-CACHE AREAS

(75) Inventors: Lance Leslie Flake, Boulder; Timothy Richard Feldman, Louisville, both of CO (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/473,781

(22) Filed: Dec. 29, 1999

(51) Int. Cl.[7] .................................................. G06F 12/06
(52) U.S. Cl. ............................. 711/173; 711/3; 711/170; 711/129; 711/144
(58) Field of Search ................................. 711/1, 6, 129, 711/144, 147, 153, 170, 173, 3

(56) References Cited

U.S. PATENT DOCUMENTS

| | | | |
|---|---|---|---|
| 5,220,518 | * 6/1993 | Haq | 365/51 |
| 5,261,066 | 11/1993 | Jouppi . | |
| 5,276,851 | * 1/1994 | Thacker et al. | 711/120 |
| 5,590,345 | * 12/1996 | Barker et al. | 712/11 |
| 5,829,051 | * 10/1998 | Steely, Jr. et al. | 711/216 |
| 5,845,308 | * 12/1998 | Dockser | 711/3 |
| 5,860,131 | 1/1999 | Daub | 711/170 |
| 5,905,996 | * 5/1999 | Pawlowski | 711/119 |
| 5,920,887 | 7/1999 | Sokolov | 711/113 |
| 5,970,508 | 10/1999 | Howe et al. | 711/113 |
| 6,047,357 | 4/2000 | Bannon et al. | 711/133 |
| 6,078,992 | 6/2000 | Hum | 711/122 |

OTHER PUBLICATIONS

An Analysis of Division Algorithms and Implementations by Stuart F. Oberman & Michael J. Flynn Technical Report: CSL–TR–95–675 Jul. 1995.

* cited by examiner

Primary Examiner—B. James Peikari
(74) Attorney, Agent, or Firm—Lisa K. Jorgenson; William J. Kubida

(57) ABSTRACT

A cache system and method for configuring and accessing a cache that enables a binary-sized memory space to be efficiently shared amongst cache and non-cache uses. A storage device is provided having a plurality of blocks where each block is identified with a block address. An access request identifies a target block address. The target block address includes an upper portion and a lower portion. A non-binary divide is performed on the upper portion to produce a quotient and a remainder. The remainder portion is combined with the lower portion to create an index. The index is applied to a tag memory structure to select an entry or set of entries in the tag memory structure. The content of the selected entry is compared to the quotient portion to determine if the target block is represented in the cache.

15 Claims, 1 Drawing Sheet

DIVISION OF MEMORY INTO NON-BINARY SIZED CACHE AND NON-CACHE AREAS

BACKGROUND OF THE INVENTION

1. Field of the Invention

The present invention relates, in general, to cache memory and methods for using cache memory, and, more particularly, to a method and system that caches using a fraction of a memory device.

2. Relevant Background

Data processing systems rely on a variety of data storage mechanisms for storing data and program code. Each storage mechanism has an associated latency that describes a delay incurred in writing data to and reading data from the storage device. Storage mechanisms range from low latency mechanisms such as static random access memory (SRAM) located physically near data processing elements to magnetic, optical and remote storage mechanisms with latencies that are several orders of magnitude larger than SRAM. Mass storage devices tend to have greater latency than working memory located physically and logically close to a data processor.

There is a continuous need for techniques that can enhance performance without significantly increasing the cost and complication of a design. Caching is one technique implemented to improve performance of data storage systems. Cache technology hides latency associated with mass storage such as magnetic and optical disk storage devices. Cache technology involves providing a quantity of relatively low latency memory that holds a copy of selected program information, memory addresses or data that is otherwise stored in a higher latency storage device. Cache technology takes advantage of principles of locality of reference, both spatial and temporal, often present in stored data to select what portions of the data are copied into the cache mechanisms. So long as a copy of the data needed by the processing element is in the cache, the data processor only sees the delay associated with low latency devices, greatly improving performance.

Many data processing systems, for example embedded systems, use a single physical memory device for all memory requirements of the systems. This is done because commercially available memory integrated circuits (ICs) have sufficient available memory capacity to provide all the functions. Using multiple chips would be inefficient. However, allocating fractional portions of a single memory device to these disparate functions is problematic.

Integrated circuit (IC) memory by nature implements storage capacity in binary-sized increments (e.g., $2^{16}$=64 Kbit $2^{24}$=16 Mbits). A particular problem exists in trying to allocate a portion of a memory IC as cache while reserving other portions for non-cache operations. By way of example, a disk drive uses memory to hold firmware tables and configuration information, but these require only a fraction of a conventional memory IC's capacity. The remaining memory capacity is desirably allocated to cache data from the slower magnetic or optical storage to improve disk access time. In the past it has been difficult to efficiently allocate only a fraction of an IC memory device to a cache.

Prior systems use a "segmented" memory architecture to allocate one or more segment(s) to caching. Each segment can be organized as a circular. Adaptive segmenting techniques enable the number and size of segments to be dynamically modified. These techniques enable the single memory device to be effectively shared between cache and non-cache uses. Unfortunately, segmented architectures require complex control logic to implement. Moreover, a segmented memory often results in poorer performance than traditional tag memory controlled cache architecture.

Tag memory controlled cache technology is largely developed for general purpose computer systems in which the memory mechanisms are implemented using multiple integrated circuit chips. Conventionally, a data address is spit into a tag portion and an index portion. The tag portion includes the most significant bits of the memory address and the index portion includes the least significant bits.

When a cache line or cache block (the smallest addressable portion of the cache) is filled with data, the index portion of the target address identifies one or more sets of cache blocks that are available to be filled. One cache block in the identified set is selected and the data is written into the selected cache block while the tag portion is written into a tag memory associated with the cache block. When data is required from memory, the index portion is used to identify one or more sets of cache blocks that may contain the data. The tag memory for the identified sets is searched to determine whether the matching tag value is stored therein. Upon a match, the data can be read out from the cache and main memory access is avoided.

The split of the target address between tag and index portions is in effect a binary division process, but requires no computational resources to achieve. The index created from the lower bits of the target address covers a binary-sized tag memory, and thus a binary-sized cache. When the memory system is implemented with a single IC, with a fraction unavailable, a binary-sized cache would be limited to a maximum of one half of the available storage. Typically this limitation wastes resources as the non-cache uses required much less than one half of the available memory space of a single IC. This limitation has prevented traditional tag-memory controlled data caches from being implemented in many sytems.

In general, generating tag and index values from a target address to access a cache should be computationally efficient. Because the cache is accessed continuously, any latency associated with generating address information has a significant cumulative effect. For this reason, tag and index generation should take as few clock cycles as possible.

SUMMARY OF THE INVENTION

Briefly stated, the present invention involves a cache system and method for configuring and accessing a cache that enables a binary-sized memory space to be efficiently shared amongst cache and non-cache uses. A storage device is provided having a plurality of blocks where each block is identified with a block address. An access request identifies a target block address. The target block address includes an upper portion and a lower portion. A non-binary divide is performed on the upper portion to produce a quotient and a remainder. Preferably, the size of the lower portion is selected to contain all bits that would not change in the remainder of a non-binary divide process applied to the entire target address. The remainder portion is combined with the lower portion to create an index. The index is applied to a tag memory structure to select an entry or set of entries in the tag memory structure. A portion of the content of the selected entry is compared to the quotient portion to determine if the target block is represented in the cache.

In another aspect, the present invention involves a binary-sized memory device having a non-binary fraction sized cache portion and a non-binary fraction sized non-cache portion. The cache portion includes a plurality of cache entries where each cache entry represents data stored at a block address of an external data storage mechanism. A tag memory having a plurality of tag entries is associated with the cache portion so that each cache entry is associated with a tag entry. Each tag entry coontains a value determined from a remainder of a non-binary division of at least a portion of a block address.

In still another aspect, the present invention involves a data storage system having a comparatively high latency data storage mechanism and a comparatively low latency data storage mechanism. The low latency mechanism comprises a binary-sized memory device having a non-binary fraction sized cache portion and a non-binary fraction sized non-cache portion. The cache portion includes a plurality of cache entries where each cache entry represents data stored at a block address of the high latency data storage mechanism. A tag memory having a plurality of tag entries is associated with the cache portion so that each cache entry is associated with a tag entry. Each tag entry comprises a value determined from a remainder of a non-binary division of at least a portion of a block address.

DETAILED DESCRIPTION OF THE PREFERRED EMBODIMENTS

The present invention is illustrated and described in terms of a disk drive storage system with a controller having an integrated cache. However, the present invention is useful in a wide variety of data storage systems that benefit from cache technology. The present invention is of greatest utility when it is desired to share memory space in a binary-sized memory device amongst cache and non-cache uses. In the particular disk drive examples herein, the cache uses include caching data from the disk drive to reduce access latency. The teachings of the present invention are readily extended to any cache structure that uses a fractional portion of a memory device.

Figure 1:
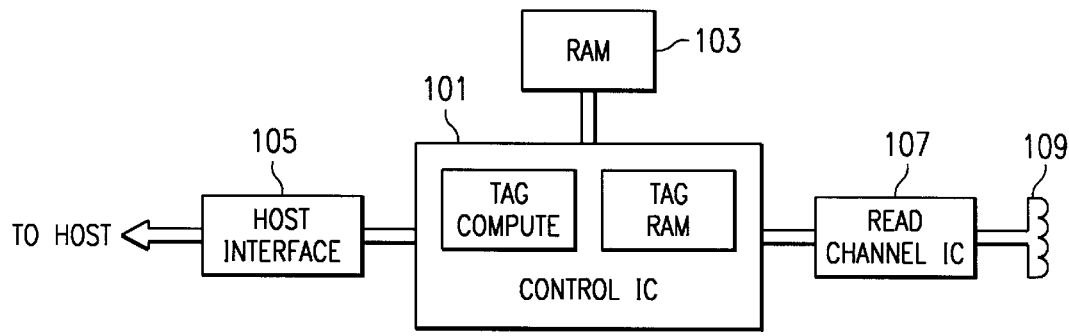
FIG. 1 illustrates an exemplary data storage environment in which the present invention is implemented.

An "intelligent" disk drive system such as shown in FIG. 1 includes a buffer memory or cache memory, implemented in RAM 103 to buffer data being transferred between the disk media (not shown) and the host system (not shown). The buffer memory reduces latency as well as adapts the disparate data rates between the data bus communicating with the host system and the read/write channel circuitry 107 that communicates with the disk media. The disk drive communicates with the host via host interface 105. Example host interfaces include small computer system interface (SCSI) and integrated drive electronics (IDE) interface.

In operation, a read command is received by host interface 105. The read command includes a block address referring to a particular block on the disk media that is to be read. The block address to be read is referred to as the "target block address" herein. Control IC 101 is a special purpose integrated circuit, typically provided as an application-specific integrated circuit (ASIC) or programmable gate array (PGA) device. Control IC 101 implements the logic to generate control signals that respond to commands from host interface 105 to read and write data from the disk media.

These operations include, among other operations, aligning read/write head 109 with the target block, controlling spin speed of rotating media, and similar control operations that are not important to a complete understanding of the present invention. To account for unusable blocks on the disk media control IC 101 tracks unusable or damaged locations and maps requests from unusable locations to usable locations. These control functions require certain amounts of memory be available to control IC 101. This memory may be used to load configuration information, parametric information, defective block maps, and the like. These types of memory uses are examples of memory that is not part of the cache feature of memory 103. As noted above, the present invention enables an efficient mechanism for sharing memory 103 amongst cache and non-cache uses described above.

Figure 2:
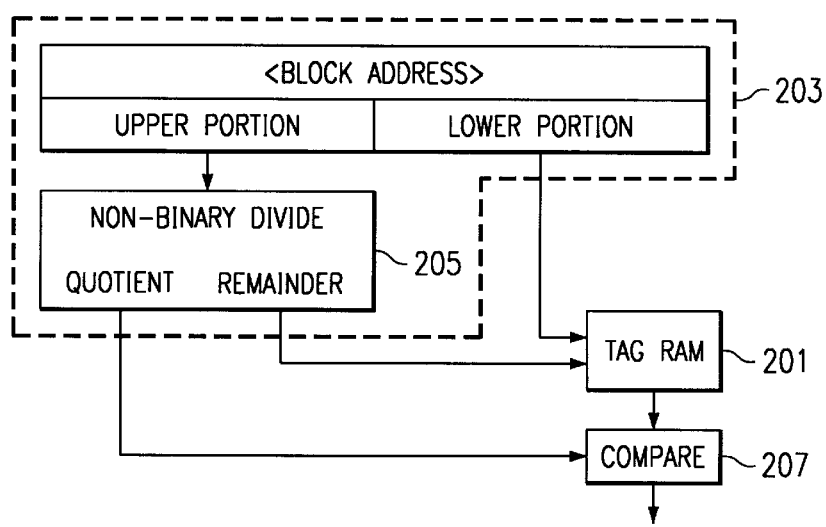
FIG. 2 shows a tag computing mechanism in accordance with the present invention.

In accordance with the present invention, control IC 101 implements a tag RAM and a tag compute unit, shown in greater detail in FIG. 2. The mechanism in accordance with the present invention enables a tag-managed cache implementation where the cache entries are stored in RAM 103. Tag RAM 201 comprises a plurality of entries where each entry holds a "tag" representing a block address that is currently cached. One tag entry exists for each cache entry.

The present invention is implemented as a direct-mapped cache meaning that each block address can only be cached in a single cache entry. In a direct-mapped implementation whenever a cache entry is being used by a first block address and second block address must be cached, the first cache address must be evicted from the cache to make room for the second cache address. In operation, a variety of cache replacement algorithms exist that may modify this eviction routine. The present invention may be extended to associative cache designs with a predictable increase in complexity. Associative designs may improve performance in some applications.

It should be understood that the tag values stored in tad memory 201 are different from conventional tag values. As noted before, conventional tag-managed caches uses a subset of the block address (e.g., a preselected number of the upper bits) as the tag value. In contrast, the present invention computes a tag value using the tag computation logic 202. In accordance with the present invention, the tag values are derived from the preselected number of upper bits, but are different from those bits.

In the example of FIG. 2, a block address comprising, for example, 28 bits is used. More or fewer bits may be used to meet the needs of a particular application. In a particular example, the block address is viewed as having an upper portion and a lower portion. The size of the upper portion and lower portion are defined so that any bits that would not change value during a non-binary divide operation of divider 205 applied to the entire block address are included in the lower portion.

Alternatively, the distinction between upper portion and lower portion can be ignored and the entire block address processed through divide unit 105. Because the latency and complexity associated with divide operations are usually a function of the number of bits being divided, this feature of the present invention allows the lower portion bits to bypass the divide operation and provide improved performance.

By way of a specific example, consider a system in which memory 103 comprises a 2 MB binary sized memory device. The area allocated for non-cache purposes is 128 KB (i.e., 1/16) while the area allocated for cache purposes is 1.875 MB (i.e., 15/16). In accordance with the present invention, tag compute logic functions to divide the block address by a multiple of 15. With data blocks of 512 bytes each, the 1.875 MB cache can hold 3840 (a multiple of 15) entries. Hence, for a direct-mapped cache the tag index is found as the 12-bit remainder after dividing the block address by 3840 and the value stored in the tag memory is the quotient. A straightforward, non-optimal implementation would supply the entire 28-bit block address to non-binary divide unit 205 which would perform a divide-by-3840 to generate a 17-bit quotient and a 12-bit remainder.

In a more optimal example shown in FIG. 2, non-binary divide unit 205 accepts the 20-bit upper portion as a term generates a 17-bit quotient and four-bit remainder after performing a divide-by-15 operation. The remaining eight bits of the tag index are taken directly from the lower portion bits. This implementation avoids processing of the eight lower portion bits through divide unit 205 in recognition that these bits will not be changed by a divide-by-3840 process.

Tag RAM 201 is indexed using the index value to identify a single entry (in the case of direct-mapped cache) or a set of entries (in the case of associative cache) that correspond to the index. The tag value stored in that tag entry is then compared to the 17-bit quotient to detect a cache hit using compare unit 207. When data is stored into a cache location from a block address the tag computation is performed in an analogous manner.

Divide unit 205 may be implemented using any available divide algorithm implemented in hardware or software. Preferably, the divide unit 205 is implemented in a manner that minimizes latency associated with the divide operation. One example of a hardware implementation is a sequential subtract-and-shift logic unit that implements a form of a digit recurrence algorithm. Other classes of divide algorithms, including functional iteration, high radix division, and variable latency algorithms are equivalent substitutes.

Divide unit 205 may be configured to divide by a static, preprogrammed divisor such as the number 15 in the examples above. It is contemplated that the divisor value can be dynamically changed in some applications to allocate variable amounts of the binary-sized memory device to non-cache uses. For example, by changing the divisor from 15 to 7 the fraction available for non-cache uses increases to 1/8 or 256 KB in the particular examples. In this manner the cache/memory devices can be configured during manufacture, upon startup or boot up of the cache devices, or dynamically during use.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for using a cache that enables a binary-sized memory space to be efficiently shared amongst cache and non-cache uses, the method comprising the steps of:
   providing a storage device having a plurality of blocks where each block is identified with a block address;
   receiving an access request identifying a target block address;
   performing a non-binary divide by a preselected divisor on at least a portion of the target block address to produce a quotient and a remainder; and
   accessing the cache using the remainder as a tag index and using the quotient as a tag value.

2. The method of claim 1 wherein the target block address includes an upper portion and a lower portion and the step of performing the non-binary divide further comprises:
   excluding the lower portion address bits from the non-binary divide; and
   combining the remainder with the lower portion block address bits to form the tag index.

3. The method of claim 2 wherein the size of the lower portion is selected to contain all bits that will not change in the non-binary divide process.

4. The method of claim 1 further comprising the steps of:
   applying the index to a tag memory structure to select an entry in the tag memory structure; and
   comparing the content of the selected to the quotient portion to determine if the target block is represented in the cache.

5. The method of claim 1 wherein the preselected divisor is a non-binary value.

6. A tag-managed cache memory for a storage device having a plurality of blocks where each block is identified by a block address, the cache memory comprising:
   an interface for receiving a cache access having a block address specified therein;
   tag computation logic receiving the block address and generating a non-binary fractional result from the block address; and
   segmenting the result from the tag computation logic into a tag portion and an index portion.

7. The tag-managed cache of claim 6 wherein the tag computation logic further comprises:
   a non-binary divider having a dividend input coupled to at least a portion of the block address, a preselected divisor stored therein, a quotient output and a remainder output.

8. The tag-managed cache of claim 7 wherein the block address comprises an upper portion having a selected number of most significant bits and a lower portion having a number of least significant bits, wherein only the upper portion is coupled to the divider.

9. The tag-managed cache of claim 7 wherein the cache is implemented in a fractional portion of a binary-sized memory device, the fractional portion being a non-binary fraction greater than one-half.

10. A binary-sized memory device comprising:
    a non-binary fraction sized cache portion; and
    a non-binary fraction sized non-cache portion.

11. The memory device of claim 10 comprising:
    a plurality of cache entries within the cache portion where each cache entry represents data stored at a block address of an external data storage mechanism.

12. The memory device of claim 11 further comprising:
    a tag memory having a plurality of tag entries where each tag entry is associated with a cache entry and each tag entry comprises a value derived from a remainder of a non-binary division of at least a portion of a block address.

13. The memory device of claim 10 wherein the cache portion is direct-mapped.

14. A data storage system comprising:
    a comparatively high latency data storage mechanism;
    a comparatively low latency data storage mechanism, wherein the low latency mechanism comprises a binary-sized memory device having a non-binary-fraction-sized cache portion and a non-binary-fraction-sized non-cache portion; and
    a cache controller coupled to the low latency data storage mechanism and the high latency data storage mechanism and operable to cache data using only the cache portion.

15. The system of claim 14 wherein the cache portion includes a plurality of cache entries where each cache entry represents data stored at a block address of the high latency data storage mechanism, the system further comprising:
    a tag memory having a plurality of tag entries wherein each cache entry is associated with a tag entry. and each tag entry comprises a value determined from a remainder of a non-binary division of at least a portion of a block address.

* * * * *